Jan. 14, 1936.  W. D. LA MONT  2,028,093
VALVE
Original Filed April 2, 1926   3 Sheets-Sheet 1
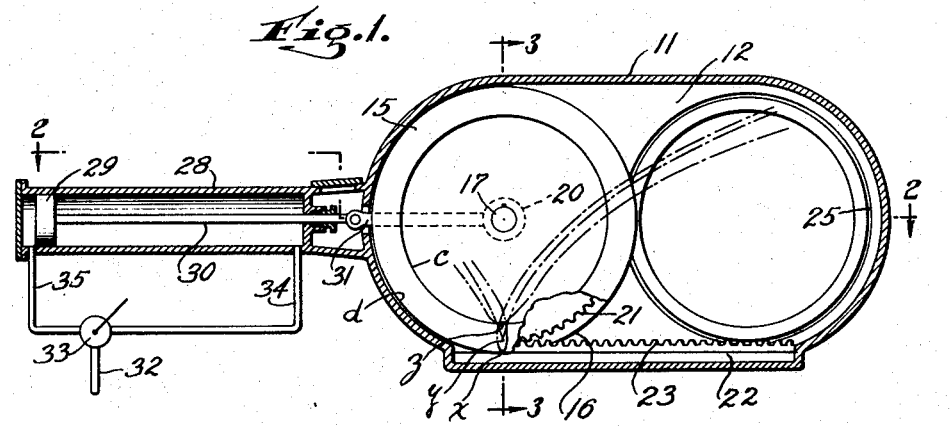
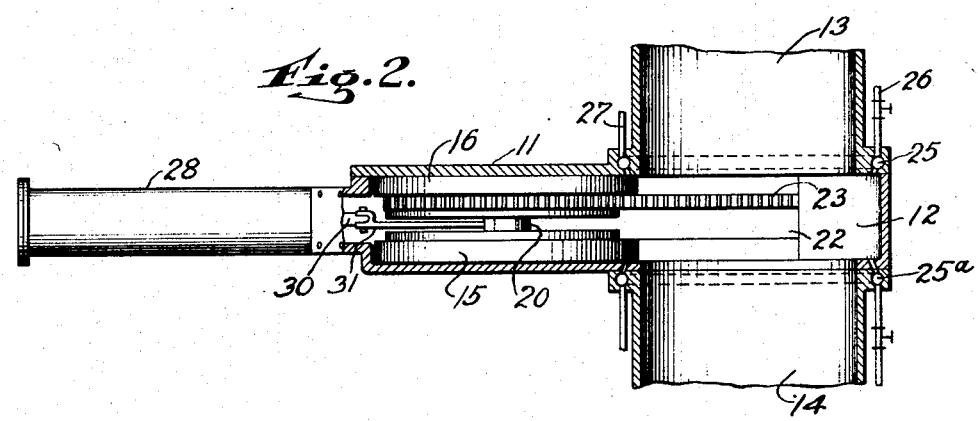
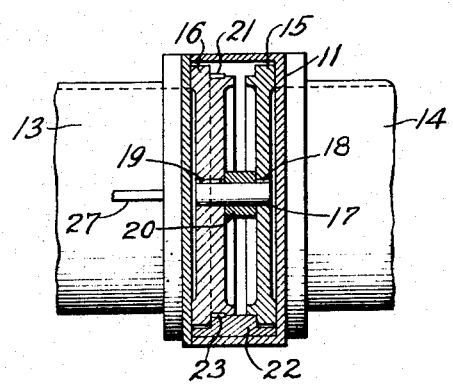
INVENTOR.
WALTER DOUGLAS LAMONT
ATTORNEY Jan. 14, 1936. W. D. LA MONT 2,028,093
VALVE
Original Filed April 2, 1926 3 Sheets-Sheet 2
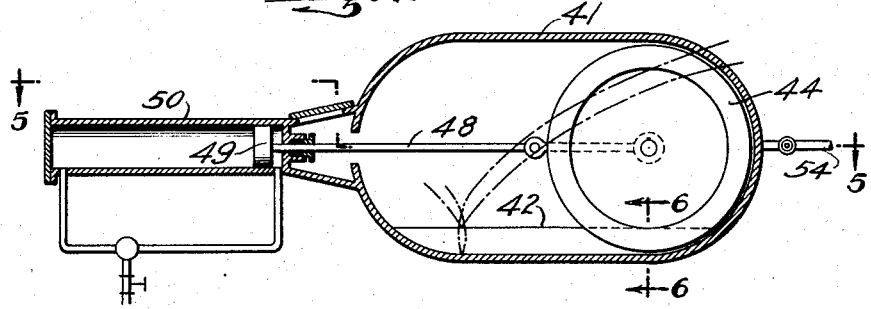
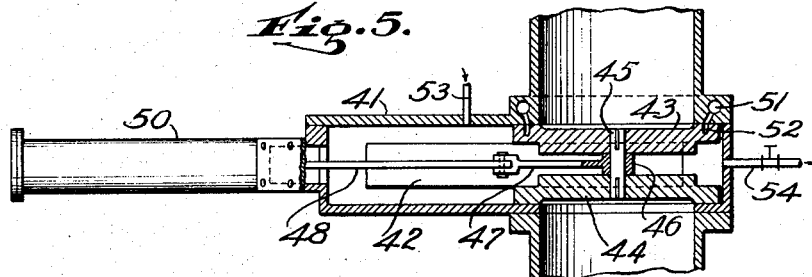
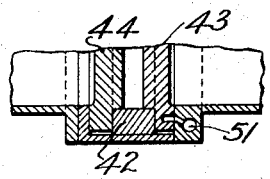
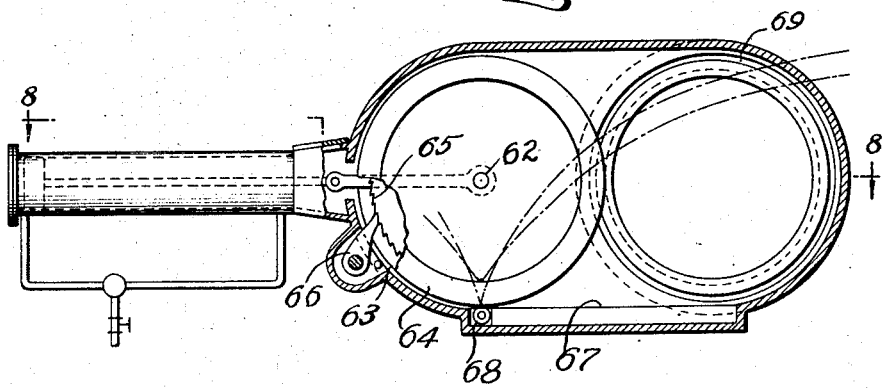
INVENTOR.
WALTER DOUGLAS LAMONT
ATTORNEY

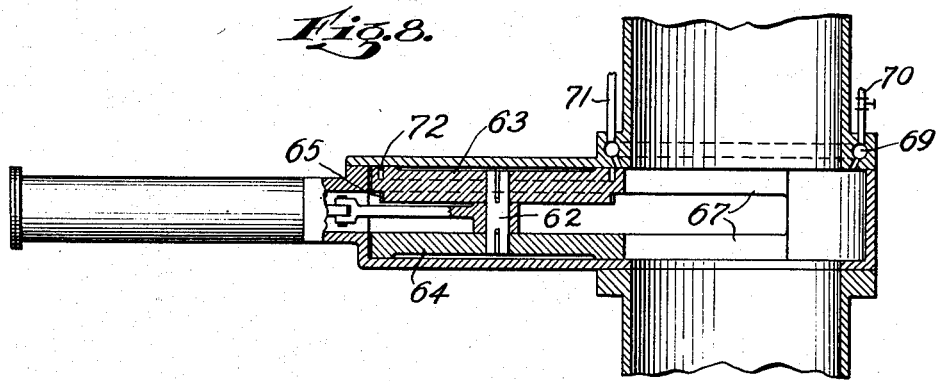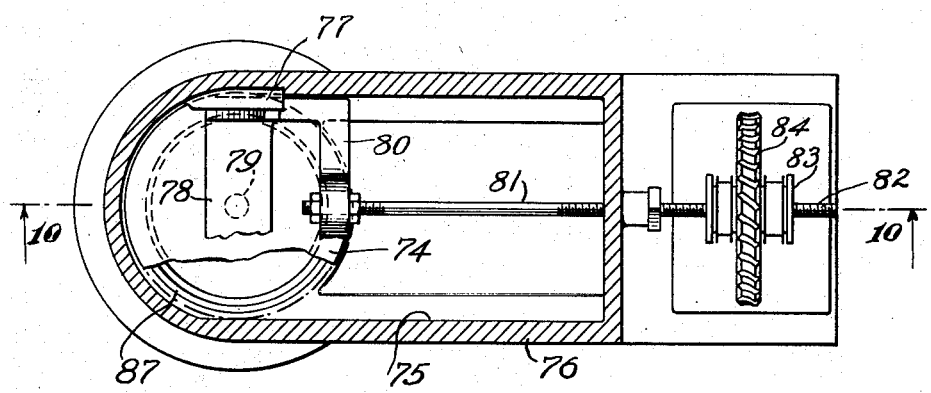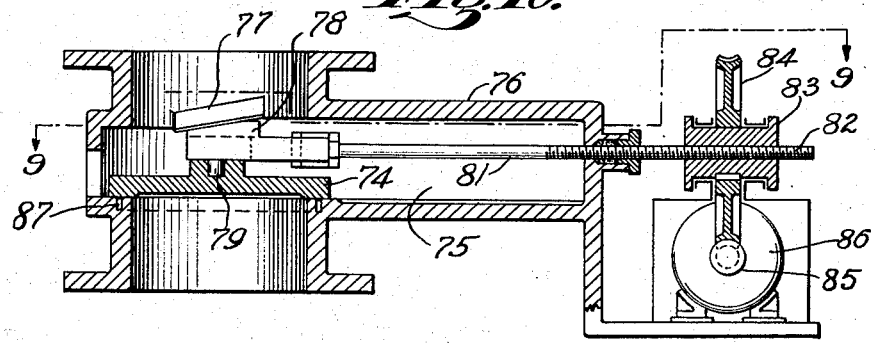

Patented Jan. 14, 1936

2,028,093

UNITED STATES PATENT OFFICE 2,028,093

VALVE

Walter Douglas La Mont, North Colebrook, Conn., assignor, by mesne assignments, to American Chain Company, Inc., a corporation of New York Original application April 2, 1926, Serial No. 99,243. Divided and this application September 12, 1931, Serial No. 562,473

2 Claims. (Cl. 251—167)

This application is a division of my copending application Serial No. 99,243, filed April 2, 1926, which was issued as Patent No. 1,826,941, on October 13, 1931.

The present invention relates to valves and has for an object to prevent leakage therethrough by introducing a fluid under pressure in the path of possible leakage.

A further object of the invention is to provide a valve with means for introducing a sealing fluid between the closure member of the valve and its seat.

A more specific object of the invention is to provide a gate valve with a groove in the seat or in the gate or in both, together with means for introducing fluid in the groove or grooves to seal the valve when the gate is in closed position.

With the above-named objects in view and others which will appear hereinafter, I shall now describe several forms of valves embodying my invention and thereafter the novelty and scope of the invention will be pointed out in the claims.

In the accompanying drawings;

Figure 1 shows the invention applied to a gate valve having a rolling closure member, the view being taken in longitudinal section;

Fig. 2 is a view in section taken on the line 2—2 of Fig. 1;

Fig. 3 is a view in transverse section taken on the line 3—3 of Fig. 1;

Fig. 4 is a view in longitudinal section of another form of rolling gate valve embodying my invention;

Fig. 5 is a view in section taken on the line 5—5 of Fig. 4;

Fig. 6 is a fragmental view in transverse section taken on the line 6—6 of Fig. 4;

Fig. 7 is a view similar to that shown in Fig. 4, except that means are provided for giving the closure member a partial rotation at every opening movement so that a different area is presented to the seat;

Fig. 8 is a view in section taken on the line 8—8 of Fig. 7;

Fig. 9 is a view in longitudinal section of a gate valve in which the gate is wedged against the seat when the valve is closed, the section being taken substantially on the line 9—9 of Fig. 10; and Fig. 10 is a view in longitudinal section taken on the line 10—10 of Fig. 9.

The gate valve shown in Figs. 1 to 3 inclusive comprises a housing 11 forming a valve chamber 12 into which open a pair of opposed conduits 13 and 14. A closure member or gate is movable in the chamber transversely with respect to the conduits to open and close communication between said conduits. This gate comprises a pair of disks 15 and 16 respectively which are supported upon a shaft 17 and preferably connected thereto by splines 18 and 19. A collar 20 is loosely mounted on the shaft between the two disks. The disks may be urged apart by a fluid pressure introduced between them as described in detail in connection with Figs. 4 and 5. Formed with or connected to the disk 16 is a toothed disk 21. A track 22 in the valve housing has a toothed portion 23 with which the teeth of the disk 21 engage. The disk 15 bears upon the plain portion of the track 22.

As the valve is moved from open to closed position the disks roll upon the track, being compelled to do so by reason of the toothed members 21 and 22. This rolling motion causes a grinding action between the valve disks and the faces of the seat tending to keep the surfaces clean and resulting in a tighter seating valve.

This grinding and smoothing action will be better understood by considering Fig. 1 wherein curves have been drawn showing the path of a point $x$, a point $y$, and a point $z$. The circles $c$ and $d$ represent the inner and outer boundary of the bearing area of the valve face. The point $x$ is on this outer circle, the point $z$ is on the inner circle and the point $y$ is between the two but on the rolling circle. Other points on the valve face will describe similar curves, and there will be crossings of curves as the valve rolls into position in contact with its seat.

In addition to this feature for cleaning and smoothing the bearing areas and providing a tight fit, I provide a groove 25 in a valve seat of the housing. This groove surrounds the opening into the conduit 13 and has an inlet 26 and an outlet 27 connected therewith. Into this groove fluid under pressure may be introduced and the pressure may be maintained at such amount as is necessary to suit different conditions. A groove 25a may also be provided in the opposite seat surrounding the opening into the conduit 14, if so desired. It is obvious also that a gate having but a single disk may be used.

A valve of the type just described may be quite large and consequently heavy. I have, therefore, shown a conventional power means to operate it, such means taking the form of a cylinder 28 in which slides a piston 29. A piston rod 30 has pivoted to it a pitman 31, the latter connected to the collar 20. A fluid supply pipe 32 admits pressure to either side of the piston under control of a valve 33 through conduits 34 and 35.

Figs. 4 to 6 illustrate another type of poppet valve in which the